United States Patent
Malegaonkar et al.

(10) Patent No.: US 9,317,671 B2
(45) Date of Patent: Apr. 19, 2016

(54) SYSTEM AND METHOD FOR SHARED FOLDER CREATION IN A NETWORK ENVIORNMENT

(75) Inventors: Ashutosh A. Malegaonkar, Milpitas, CA (US); Raman Thapar, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 400 days.

(21) Appl. No.: 13/572,022

(22) Filed: Aug. 10, 2012

(65) Prior Publication Data

US 2014/0047498 A1    Feb. 13, 2014

(51) Int. Cl.
| | |
|---|---|
| G06F 21/31 | (2013.01) |
| H04L 29/08 | (2006.01) |
| G06F 21/62 | (2013.01) |
| H04L 29/06 | (2006.01) |

(52) U.S. Cl.
CPC ............ *G06F 21/31* (2013.01); *G06F 21/6209* (2013.01); *H04L 63/08* (2013.01); *H04L 67/1097* (2013.01); *G06F 2221/2143* (2013.01)

(58) Field of Classification Search
CPC ................................ G06F 21/00; H04L 63/00
See application file for complete search history.

(56) References Cited

U.S. PATENT DOCUMENTS

| | | | |
|---|---|---|---|
| 6,865,597 B1 | 3/2005 | Bandopadhyay et al. | |
| 7,366,720 B2 * | 4/2008 | Deshpande | 709/226 |
| 7,565,413 B1 * | 7/2009 | O'Toole, Jr. | 709/219 |
| 7,865,462 B2 * | 1/2011 | Hara | 707/610 |
| 8,874,907 B1 * | 10/2014 | Christensen et al. | 713/165 |
| 2006/0080362 A1 * | 4/2006 | Wagner et al. | 707/200 |
| 2009/0100347 A1 * | 4/2009 | Schemers et al. | 715/751 |
| 2010/0138430 A1 * | 6/2010 | Gotou | 707/754 |

* cited by examiner

*Primary Examiner* — Ellen Tran
*Assistant Examiner* — Wasika Nipa
(74) *Attorney, Agent, or Firm* — Patent Capital Group (57) ABSTRACT

A method includes receiving a request over a network from a user to mount a shared folder, which is configured to store electronic data to be selectively accessed based on a policy. The method also includes evaluating whether the user is authenticated. The method also includes generating a random mount point for mounting the shared folder, and redirecting the user to the random mount point if the user is authenticated.

19 Claims, 6 Drawing Sheets

SYSTEM AND METHOD FOR SHARED FOLDER CREATION IN A NETWORK ENVIORNMENT

TECHNICAL FIELD

This disclosure relates in general to the field of communications and, more particularly, to a system and a method for shared folder creation in a network environment.

BACKGROUND

Cloud computing can provide flexibility and scalability to any Information Technology (IT) organization. Furthermore, it can enable an organization to provision new services quickly and cost effectively by resolving common IT requirements and policies. Cloud computing can also meet high utilization demands and dynamically respond to changes in the organizational environment. Many cloud computing environments are multi-tenancy multi-user environments, with users accessing common folders and files. Multi-tenancy multi-user environments may increase operational efficiency through a cost-effective use of expensive infrastructure. One issue that surfaces in environments in which files are routinely shared relates to security. There are certain inefficiencies and vulnerabilities in many cloud computing and/or shared file paradigms that should be resolved.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided and includes receiving a request over a network from a user to mount a shared folder, which is configured to store electronic data (any type of information) to be selectively accessed based on a policy (e.g., the policy could dictate that only certain users would have access to the shared folder). The method also includes evaluating whether the user is authenticated (e.g., using any suitable authentication protocol). This could involve the use of cookies, previously cached authentication credentials, enterprise configurations (e.g., virtual private network (VPN) authentications), location-based authentication in any form, etc. The method also includes generating a random mount point for mounting the shared folder, and redirecting the user to the random mount point if the user is authenticated.

The random mount point can be generated using a random number generator, which can simply be reflective of any type of algorithm for generating such a random number. A path for the shared folder can be dynamically created in response to the request, and the path can be destroyed (i.e., taken down, made inaccessible, etc.) in response to user signoff.

In certain example implementations, the method can include creating a substantially identical copy of the shared folder at the random mount point. Certain data of the shared folder can be provided at a secondary location based on a caching policy. Additionally, the method could include synchronizing the random mount point with the shared folder when the shared folder is unmounted. The request can be received during a user session, where invalidating the random mount point can occur if either (or both) of the following events occur: (a) expiring of the user session; and (b) receiving a request from the user to unmount the shared folder.

Example Embodiments

Figure 1:
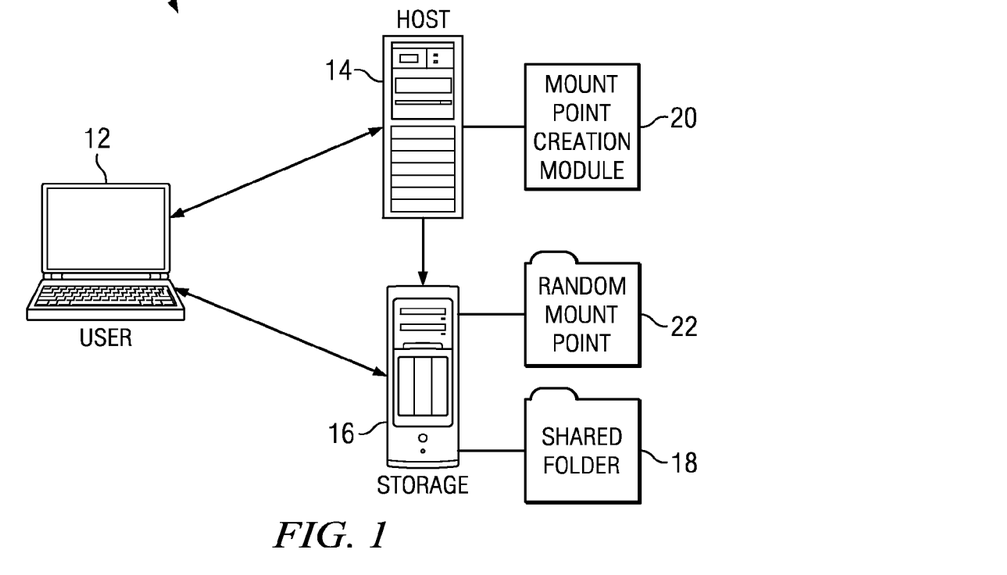
FIG. 1 is a simplified block diagram illustrating a communication system for shared folder creation in a network environment according to an example embodiment.

Turning to FIG. 1, FIG. 1 is a simplified block diagram illustrating a communication system 10 for shared folder creation in a network environment in accordance with one example embodiment. Communication system 10 includes a user 12 that can access a host 14 to read and write from a storage 16 in communication with host 14. The term "user" is inclusive of any electronic device (e.g., computer, smartphone, iPad, etc.), client, server, peer, endpoint, user equipment, service, application, process, or other object capable of sending, receiving, or forwarding information over communication links in a network environment.

Storage 16 may include a shared folder 18, to which various users may have access permission. During a user session, a mount point creation module 20 may create a random mount point 22, through which user 12 may access shared folder 18. As used herein, the term "mount point" refers to a file system object, such as a locally available link, directory, folder, or file, at which a storage medium, file system, disk partition, directory, folder, file, or similar object can be made accessible. More generally, the term "mount" is meant to encompass any type of provisioning, creation, generation, construction, assignment, relegation, allocation, associated with initiating a shared folder.

For example, user 12 may request to mount shared folder 18, which may be located on a specific, fixed path (e.g., /host/shared_folder). Depending on the particular operating system of user 12, such a request may be implemented through a command such as "mount host/shared_folder /local/mount_point," which may mount a folder located at host/ shared folder to location /local/mount_point on user 12. As used herein, the term "random mount point" refers to a mount point created according to the embodiments described herein. In various embodiments, random mount point 22 may be created at a randomly generated path, for example, /host/ random#1.

According to various embodiments, mount point creation module 20 may create a substantially identical copy of shared folder 18 at random mount point 22 and redirect user 12 to random mount point 22 instead of shared folder 18. Redirection can include sending instructions to user 12 to connect to the redirected path (e.g., /host/random#1), rather than the requested path (e.g., host/shared_folder). Redirection may be transparent to user 12, and may be effected automatically, without intervention by an end user (e.g., human operator). In various embodiments, random mount point 22 may be generated on storage 16. The mount request may be regenerated (e.g., by user 12) as /host/random#1/local/mount_point. After the mount command runs (and if user 12 has proper permissions from host 14) user 12 can view, through appropriate commands, a listing of the files in /host/shared_folder that has been substantially copied to random mount point 22 at /host/ random#1.

In various embodiments, random mount point 22 can be a folder that may be substantially identical to shared folder 18. During the user session, user 12 may read and write from random mount point 22 as though it were shared folder 18. When the user session is terminated, random mount point 22 may be unmounted from the file system of host 14, and random mount point 22 may be deleted, destroyed, erased, or otherwise rendered inaccessible. When random mount point 22 is unmounted, changes made to random mount point 22 during the user session may be propagated to shared folder 18. For example, when the user session is terminated, random mount point 22 may be synchronized with shared folder 18 through a synchronization process.

In various embodiments, the path exposed to user 12 for accessing shared folder 18 may change with each new session. When user 12 starts another user session and attempts to re-mount shared folder 18, mount point creation module 20 may generate a second random path (e.g., /host/random#2) for random mount point 22 that may be different from the previously generated random path (e.g., host/random#1) for random mount point 22. Changes made to random mount point 22 during the previous user session, having been propagated to shared folder 18, would be visible in the newly generated random mount point 22 during the second user session.

In various embodiments, communication system 10 may facilitate dynamic mounting of shared folder 18, for example, to reduce attack surfaces and make shared folder creation and maintenance more convenient. Random paths for random mount point 22 that may be valid (merely for a specific user and corresponding user session) can reduce hacking and other attacks on shared folder 18, as the actual path of shared folder 18 on storage 16 may be rendered invisible to user 12 through the random path of random mount point 22. In various embodiments, user logins to authenticate users can also ensure optimized resource allocation.

For purposes of illustrating the techniques of communication system 10, it is important to understand the communications in a given system such as the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

In a multi tenant and/or multi user environment serving hundreds of users, creation of a folder per user with user specific access controls at configuration or user provisioning time may not be ideal. At any given instant, many folders may not be in use by any of the users, although they may be accessible by any user. In particular, shared folders that are accessible by multiple users may face security risks due to their fixed paths in the system. For example, having shared folders permanently exposed increases the probability of the shared folders or the shared folder service being used as a launch pad for attack by bots (e.g., a loosely organized system of computers that responds to commands issued by an attacker from a central location), especially for Windows® based systems. A Linux based operating system (OS) may be used to circumvent inherent Windows vulnerabilities. The Linux OS may firewall the Windows OS and act as a primary interface to the user. However, shared folders implemented in Linux (e.g., using services like Samba) can also have associated vulnerabilities.

Bots (e.g., malicious software) can infiltrate companies by searching for vulnerable points of entry in a network, such as a shared folder (e.g., network share). Once a bot infects a computer, the machine can be controlled by another entity outside the network and can become part of another network of infected computers. One of the bots' modes of entry may arise from employees operating outside their company's network with a device that is poorly protected against direct, hacking-style attacks. In particular, bots can use sniffers to identify sources and destinations of packets traversing the infected computer, and can determine, for example, the location of shared folders. Once the shared folder location is known and exposed to the bots, the bots can infect the shared folders, and use the shared folders as launch pads for attacks deeper into the network.

Communication system 10 is configured to address these issues (and others) in offering a system and a method for shared folder creation in a network environment. Embodiments of communication system 10 can receive a request to mount shared folder 18 (e.g., /host/shared_folder), generate a random path (e.g., /host/random#1) to mount shared folder 18, and respond with the random path. In various embodiments, a surface of attack may be mitigated by creating and exposing shared folder 18 on a demand-supply basis. A trigger for the demand could be any event that authenticates user 12, including system login through a user interface (UI) page, Kerberos based authentication, or an application programming interface (API) based request.

After identity of user 12 is confirmed, embodiments of communication system 10 may allocate and expose shared folder 18 through random mount point 22, which can be accessible by user 12. In some embodiments, such accessibility may be provided through a dynamically generated path to random mount point 22. In various embodiments, random mount point 22 may be invalidated (e.g., destroyed, deleted, or otherwise rendered inaccessible) when at least one event occurs from a group consisting of: (a) expiration of the user session, and (b) a request from user 12 to unmount shared folder 18. For example, after user 12 is signed off from the user session, random mount point 22 can be unmounted and optionally destroyed so that access to random mount point 22 is terminated. A bot that may have captured the path to random mount point 22 would have stale information, as the path may not be valid after the user session has expired.

In various embodiments, the user session may be initiated upon a request by user 12 to mount shared folder 18, and the user session may expire when user 12 requests unmounting of shared folder 18 (e.g., by unmounting random mount point 22). In some embodiments, the user session may be initiated when user 12 logs into host 14, and the user session may expire when at least one of the following events occur: (1) user 12 signs off from the user session (e.g., user 12 logs out of host 14, user 12 unmounts user folder 18, etc.), and (2) the user session times out (e.g., after a predetermined time of inactivity). Any mechanism to initiate and expire the user session may be implemented within the broad scope of the present disclosure.

Embodiments of communication system 10 may also make optimizations for resource allocation in a distributed environment to point to a hardware resource closest to the location of user 12 at a given time. For example, for a travelling worker (e.g., mobile user), the share (e.g., random mount point 22) could be physically located on a server in New York on the day the worker is in New York and the share could be moved to San Jose when the worker moves to San Jose. Simultaneously, resources can be freed up for use by other system users. If the share is not to be destroyed, the data can be backed up at a secondary location based on caching or other such policy.

In various embodiments, shared folder access could also be enabled through HTML5 based graphical user interfaces (GUIs), Samba, or Common Internet File System (CIFS) to enable drag and drop functionalities. In addition, as the path to random mount point 22 may not be fixed, optimization algorithms can be implemented in addition to folder creation/sharing logic to improved the shared folder access efficiency. Embodiments of communication system 10 can present various advantages. For example, dynamic shared folder creation and policy application to folder creation can reduce the attack surface. When random mount point 22 is created, policies such as access control lists (ACLs) can be dynamically applied automatically without any need for manual intervention. Faster shared folder access can be enabled at remote sites through dynamic folder creation at local resources. Furthermore, embodiments of communication system 10 can optimize the access and storage of data through appropriate caching policies.

In various embodiments, for every session, user 12 may authenticate and mount random mount point 22 from the random path generated post-authentication for the specific user and user session. The random path may be a logical connection to physical share folder 18. If a particular user, say user 1, requests mounting \\share\user1, user 1 may be redirected to a random path, say, \\share\1234. Another user, say, user 2, requesting mounting to the same share (i.e., \\share\user1), may be redirected to \\share\1345. Both \\share\1234 and \\share\1345 may point to the same physical shared folder 18 through two separate random mount points, while the physical location of shared folder 18 remains unexposed to the different users.

In various embodiments, storage 16 may be configured with appropriate protocols and applications to support ACLs. In such embodiments, host 14 may direct storage 16 to allow permissions (e.g., read, or write permissions) to user 12 according to applicable ACLs. The applicable ACLs may be determined from user authentication credentials (e.g., username and password) in some embodiments. In other embodiments, the applicable ACLs may be determined through other mechanisms (e.g., IP address of user 12, operating system of user 12, etc.). Various mechanisms to apply ACLs may be implemented according to the broad scope of the embodiments discussed herein.

Turning to the infrastructure of communication system 10, the network topology can include any number of users, hosts, storage, servers, routers, gateways, and other nodes interconnected to form a large and complex network. A node may be any electronic device, user, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that the communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, storage 16 may be any kind of storage medium, including any type of hard disk drive, floppy disk drive, erasable programmable read only memory (EPROM), electrically erasable programmable read only memory (EEPROM)), random access memory (RAM), read only memory (ROM), flash memory, optical disks, CD-ROMs, DVD ROMs, magnetic or optical drives, or other types of machine-readable mediums suitable for storing electronic instructions. More generally, storage 16 can be provisioned as part of any server, proprietary device, console, database, computer, register, table, cache, queue, or other storage structures, all of which could be referenced in any suitable timeframe.

In certain embodiments, storage 16 may be physically separated from host 14 over a network; in other embodiments, storage 16 may be physically collocated with host 14 in a common device such as any of those identified above. In various embodiments, host 14 may be a server application running in a server computer, or other such computing device. Mount point creation module 20 may be an application running within host 14 in one embodiment. In another embodiment, mount point creation module 20 may be a stand-alone application running alongside host 14. In yet another embodiment, mount point creation module 20 may be located in a device separate from host 14, and accessed by host 14 at each mount request from user 12.

Figure 2:
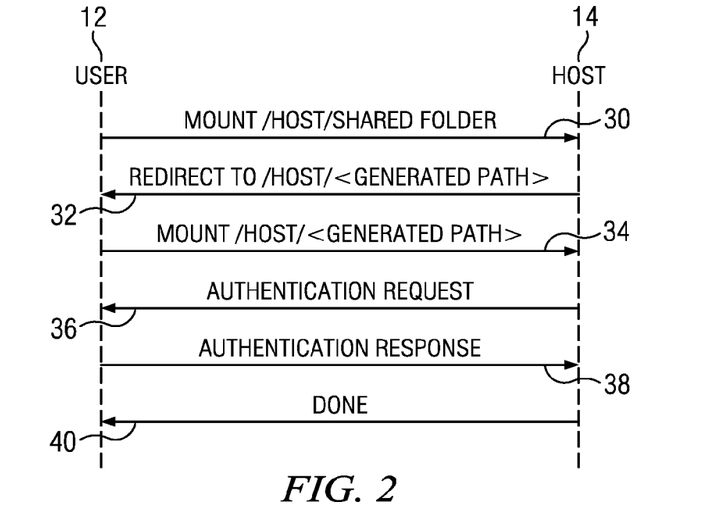
FIG. 2 is a simplified sequence diagram illustrating example activities that may be associated with an example embodiment of the communication system.

Turning to FIG. 2, FIG. 2 is a simplified sequence diagram illustrating certain example activities that may be associated with an embodiment of communication system 10. At 30, user 12 may send a request to host 14 to mount shared folder 18 at host/shared folder. At 32, host 14 may create random path (e.g., host/<generated path>) and redirect user 12 to /host/<generated path> for random mount point 22. At 34, user 12 may request to mount random mount point 22 at /host/<generated path>. At 36, host 14 may send an authentication request, for example, login credentials to user 12. At 38, user 12 may respond with an authentication response, for example, an appropriate user name and corresponding password. Various other authentication mechanisms may be used within the broad scope of the embodiments discussed herein. For example, security certificates, passkey, fingerprints, etc. may be used as authentication mechanisms. The authentication response may indicate appropriate permissions from an associated Access Control List (ACL). For example, the authentication response may indicate that user 12 has read and write permissions to the requested folder. Host 14 may appropriate cause storage 16 to enforce such permissions from the ACL on random mount point 22. Storage 16 may mount random mount point 22 with the appropriate permissions at 40.

Figure 3:
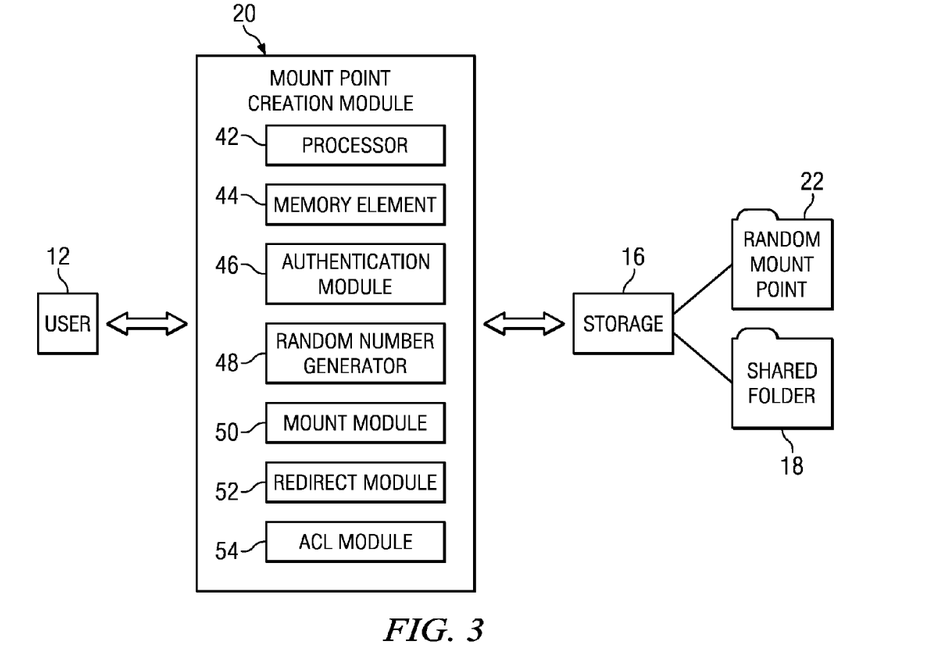
FIG. 3 is a simplified block diagram illustrating example details of an embodiment of the communication system.

Turning to FIG. 3, FIG. 3 is a simplified block diagram illustrating example details of embodiments of communication system 10. Mount point creation module 20 may include a processor 42, a memory element 44, an authentication module 46, a random number generator 48, a mount module 50, a redirect module 52, and an ACL module 54. In various embodiments, user 12 may request to mount shared folder 18, located within storage 16. Authentication module 46 may respond with an authentication request, and verify the authentication response from user 12. Random number generator 48 may generate a random number, for example, random#1.

In various embodiments, random number generator 48 may be a computational or physical device designed to generate a sequence of numbers or symbols that lack any pattern. The random number may be generated through any known methods, including mechanisms similar to security key generation, and other authentication and/or security algorithms. In many embodiments, the seed for random number generation may include a combination of various session-specific and user-specific parameters, such as user name, IP address of user 12, name of shared folder 18, and password, among other parameters.

Mount module 50 may direct storage 16 to create random mount point 22 at a path that includes the generated random number (e.g., /host/random#1). Storage 16 may copy all (or at least substantially all) contents of shared folder 18 to random mount point 22 at the random path. Redirect module 52 may respond to the user request with the random path. User 12 may thereafter directly interface with random mount point 22 via the random path, and mount random mount point 22 appropriately. In some embodiments ACL module 54 may direct storage 16 to generate random mount point 22 according to predetermined ACL policies. For example, a specific user 12 may have only read permissions to shared folder 18. Accordingly, storage 16 may create random mount point 22 with read-only permissions for user 12. In another example, user 12 may have both read and write permissions according to the ACL. Accordingly, storage 16 may create random mount point 22 with read and write permissions for user 12.

Figure 4:
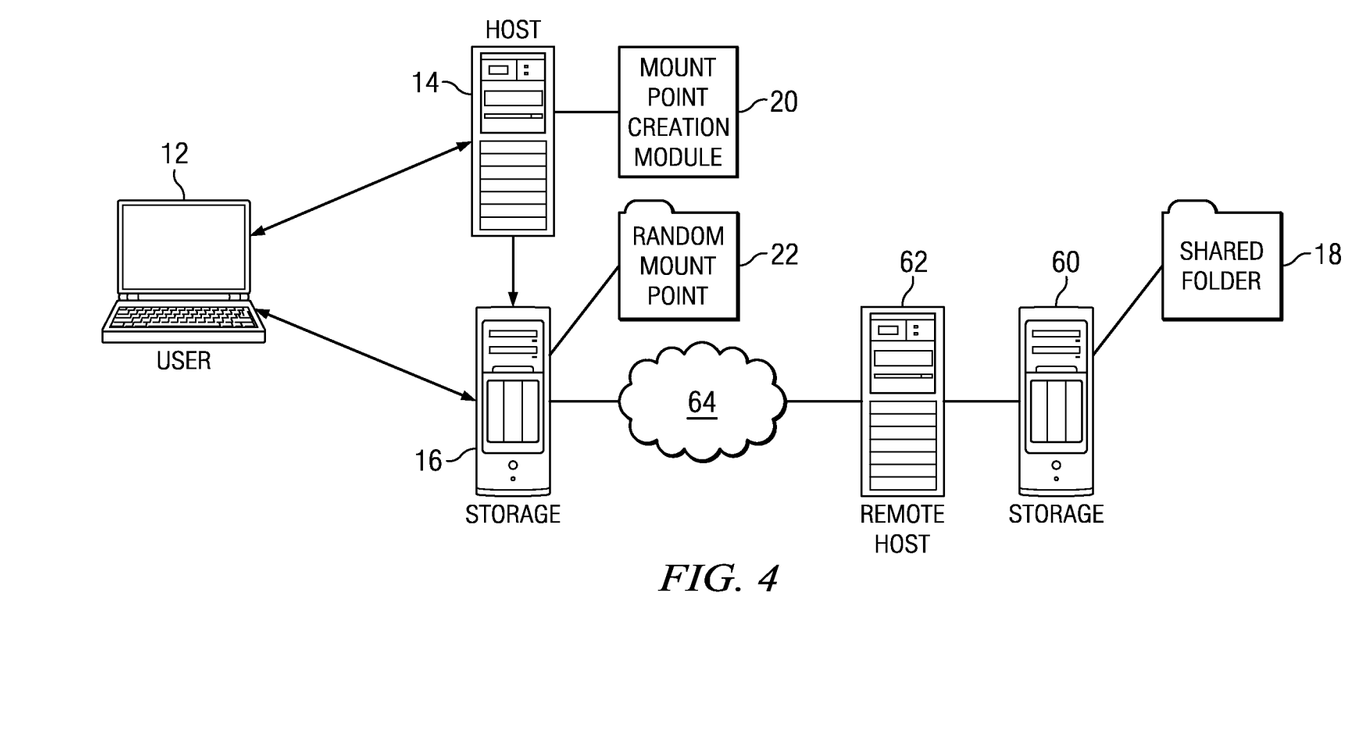
FIG. 4 is a simplified block diagram illustrating another example embodiment of the communication system.

Turning to FIG. 4, FIG. 4 is a simplified block diagram illustrating another embodiment of communication system 10. Shared folder 18 may be located at a remote storage 60, associated with a remote host 62. Remote host 62 may be accessible to host 14 and storage 16 via public networks 64, such as the Internet. For example, host 14 may be an enterprise server located in New York, and remote host 62 may be another enterprise server located in Los Angeles. In an example embodiment, a worker may have a fixed office with an associated desktop in San Jose, and may travel to New York temporarily. While at New York, the worker may want to access the worker's desktop in San Jose, for example, to retrieve some files stored in the desktop's hard drive. Connecting directly to remote host 62 from a laptop or other mobile device (user 12) and downloading any desired files from remote storage 60 may take a long time, and may be prone to security risks. Instead, the desktop and associated files in shared folder 18 may be accessed through local host 14 in New York.

In various embodiments, user 12 may attempt to mount shared folder 18 via a mount request to local host 14. Mount point creation module 20 in host 14 may generate a random path, and direct storage 16 to create random mount point 22 locally, for example, in storage 16. Storage 16 may create random mount point 22 with write only permissions and permit user 12 to mount random mount point 22. Storage 16 (or alternatively, host 14) may initiate a remote session (e.g., through virtual private network, or other such secure connection) with remote host 14, and request mounting shared folder 18. After shared folder 18 is successfully mounted, storage 16 may copy substantially all contents of shared folder 18 into random mount point 22. According to another embodiment, storage 16 may merely copy substantially all contents of shared folder 18 over the remote connection, without mounting shared folder 18. In some embodiments, shared folder 18 may be unmounted from storage 16 after copying substantially all its contents to random mount point 22. The connection to remote host 62 may also be terminated simultaneously.

Subsequently, storage 16 may allow read and write access (according to applicable ACL policies). User 12 may read and write to random mount point 22 locally. The local connection may be faster than the remote connection. When the user session expires, storage 16 may reopen the connection (or alternatively, open a new connection) with remote host 62, and synchronize random mount point 22 with shared folder 18 on remote storage 60. Changes made to random mount point 22 may be propagated to shared folder 18. Random mount point 22 may be subsequently deleted, destroyed, or otherwise rendered inaccessible.

Figure 5:
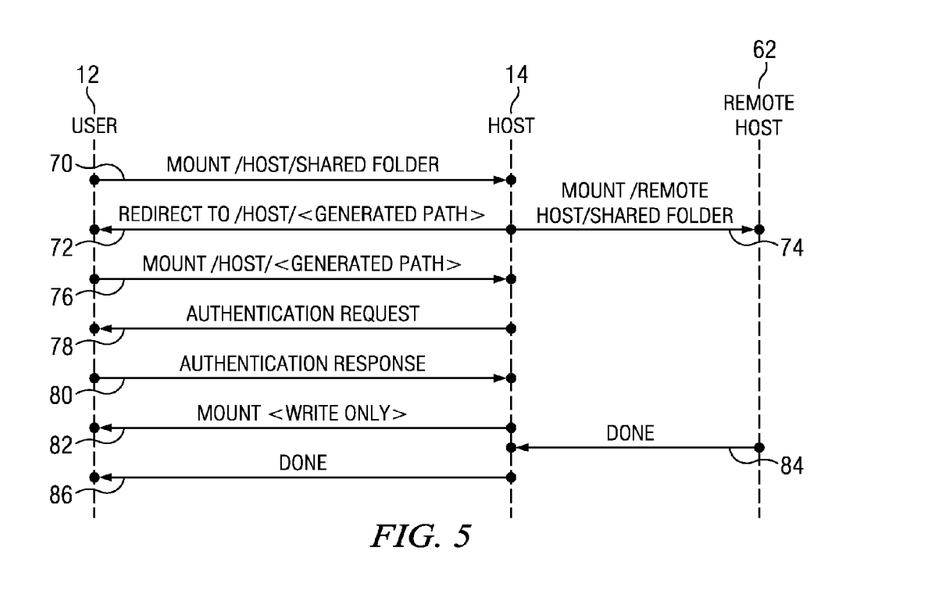
FIG. 5 is a simplified sequence diagram illustrating example activities according to an embodiment of the communication system.

Turning to FIG. 5, FIG. 5 is a simplified sequence diagram illustrating example activities that may be associated with embodiments of communication system 10. At 70, user 12 may send a request to host 14 to mount shared folder 18 at /host/shared folder. Shared folder 18 may be located at remote storage 60. At 72, host 14 may generate the random path, and redirect user 12 to the generated path, for example, /host/<generated path>. In various embodiments, the random path may point to local storage 16, and random mount point 22 may be created at local storage 16. At 74, host 14 may interface with remote host 62, and request to mount shared folder 18 at /remote host/shared folder. At 76, user 12 may send a request to mount random mount point 22 at /host/<generated path>.

At 78, host 14 may send user 12 an authentication request. At 80, user 12 may respond with the appropriate authentication response. Host 14 may cause storage 16 to review relevant ACLs and enforce applicable policies on random mount point 22 as appropriate. At 82, storage 16 may create random mount point 22 with new write (no edit or read)-only permissions. The new write only version may be made available until such time as shared folder 18 is mounted successfully on storage 16. Thus, user 12 may mount the write only version of shared folder 18. At 84, shared folder 18 may be successfully mounted on host 14. After shared folder 18 is successfully mounted on host 14 (e.g., on storage 16), substantially all contents of shared folder 18 may be made available at random mount point 22. At 86, the process ends, as shared folder 18 is made visible to user 12, with suitable read and write permissions, according to applicable ACL policies.

Figure 6:
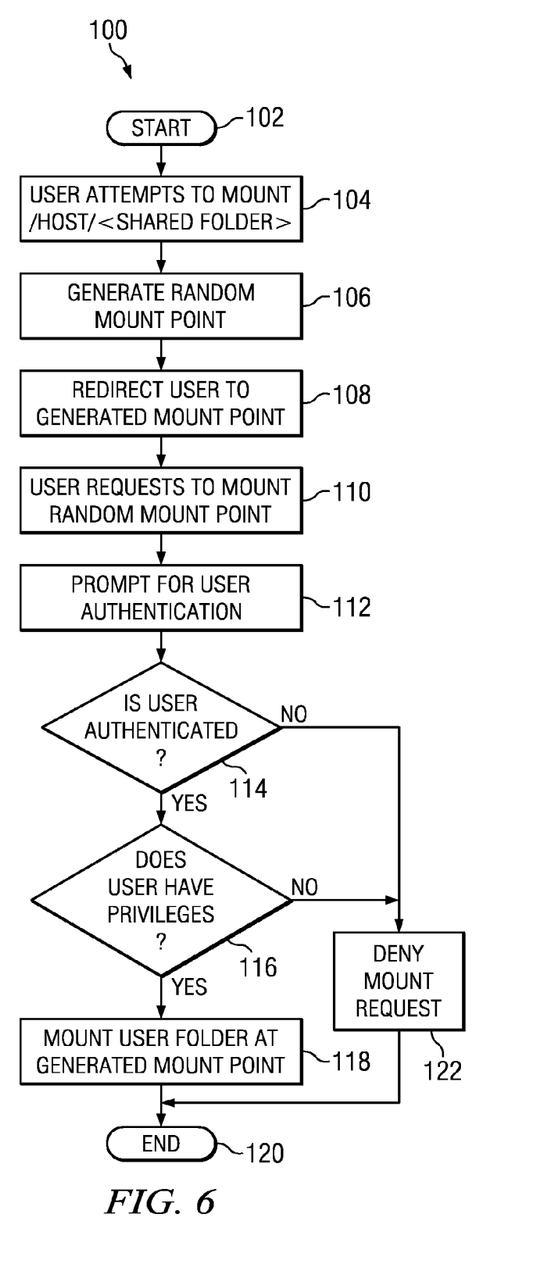
FIG. 6 is a simplified flow diagram illustrating example activities that may be associated with embodiments of the communication system.

Turning to FIG. 6, FIG. 6 is a flow diagram illustrating example operational activities that may be associated with mounting shared folder 18 in an example embodiment of communication system 10. Operations 100 may start at 102, for example, when user 12 connects to host 14. At 104, user 12 may attempt to mount /host/<shared folder>. Host 14 may generate a random mount point at 106. At 108, host 14 may direct storage 16 to create a substantially identical copy of shared folder 18 at generated random mount point 22 and redirect user 12 to the generated random mount point 22. At 110, user 12 may request to mount random mount point 22. In an example embodiment, the request may be directed to storage 16.

At 112, host 14 may prompt for user authentication. For example, a pop up message may be presented on a display associated with user 12, asking for login credentials (e.g., user name and password). At 114, host 14 may determine whether user 12 is authenticated. If user 12 is authenticated, at 116, host 14 checks whether user 12 has privileges to access (e.g., read or write to) shared folder 18. If user 12 has privileges to access shared folder 18, host 14 may direct storage 16 to mount user folder at generated mount point with the appropriate permissions and privileges. The operations may end at 120. Turning back to 114, if user 12 is not authenticated, or if user 12 does not have privileges to access shared folder 18 at 116, the mount request may be denied at 122.

Figure 7:
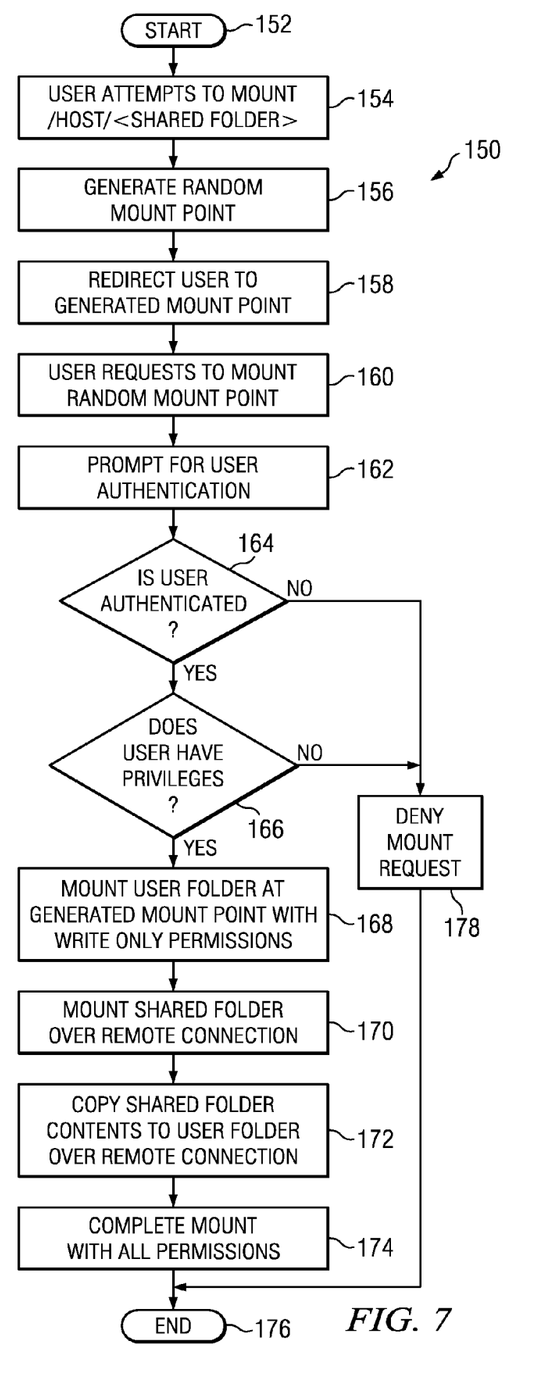
FIG. 7 is a simplified flow diagram illustrating other example activities that may be associated with embodiments of the communication system.

Turning to FIG. 7, FIG. 7 is a simplified flow diagram illustrating other example activities that may be associated with mounting shared folder 18 over a remote connection. Operations 150 may start at 152, for example, when user 12 logs into host 14. At 154, user 12 may attempt to mount shared folder 18 at /remote host/shared folder. At 156, host 14 may generate random mount point 22 (e.g., /host/random#1) locally (e.g., at local storage 16). At 158, storage 16 may create a folder at random mount point 22 locally and host 14 may redirect user 12 to the generated to random mount point 22. At 160, user 12 may request to mount random mount point 22.

At 162, host 14 may prompt for user authentication. At 164, user 12's authentication credentials may be checked to determine whether user 12 is authenticated. If user 12 is authenticated, user 12's privileges to access shared folder 18 may be checked at 166. If user 12 has privileges to access shared folder 18, at 168, storage 16 may mount user folder 18 at the generated mount point with write-only permissions. At 170, host 14 may open a remote connection to remote storage 60 (e.g., through remote host 62) and mount shared folder 18 over the remote connection. At 172, host 14 (or storage 16) may copy substantially all contents of shared folder 18 to random mount point 22 over the remote connection. At 174, host 14 may complete mount with all appropriate permissions (e.g., read and write), for example, according to applicable ACL policies. The operations may end at 176. Turning back to 164, if user 12 is not authenticated or if user 12 does not have privileges to access shared folder 18 at 166, the mount request may be denied at 178.

Figure 8:
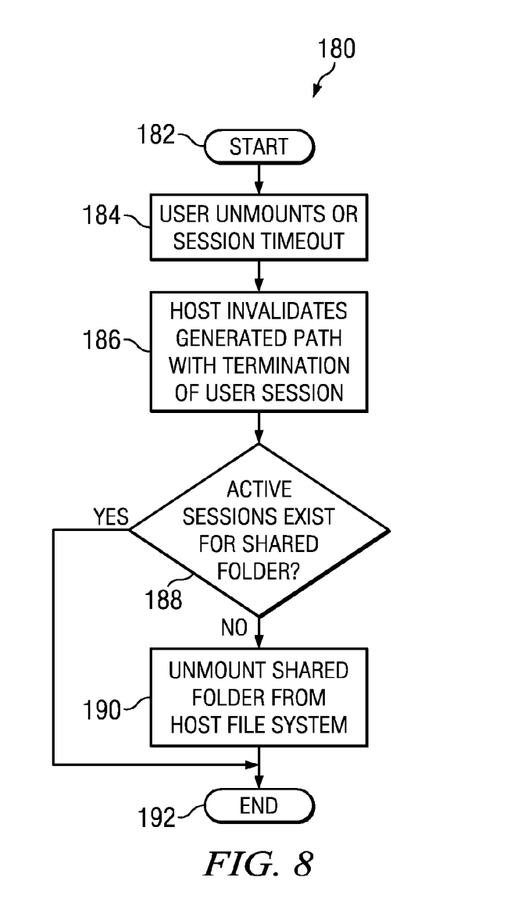
FIG. 8 is a simplified flow diagram illustrating yet other example activities that may be associated with embodiments of the communication system.

Turning to FIG. 8, FIG. 8 is a simplified flow diagram illustrating yet other example activities that may be associated with unmounting shared folder 18 in an example embodiment of communication system 10. Operations 180 may start at 182, for example, during a user session. At 184, user 12 may unmount random mount point 22 (e.g., through a suitable unmount request to host 14). Alternatively, the unmount process may automatically follow a session timeout. At 186, host 14 may invalidate the generated path with termination of the user session. At 188, a determination may be made whether active sessions (e.g., with other users) exist for shared folder 18. If active sessions do not exist, shared folder 18 may be unmounted from the file system of host 14 at 190, and the operations may end at 192. If active sessions exist, shared folder 18 may remain mounted on host 14.

Figure 9:
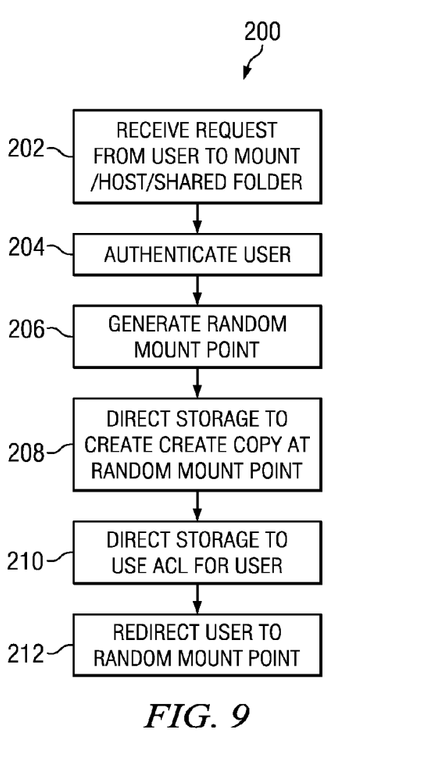
FIG. 9 is a simplified flow diagram illustrating yet other example activities that may be associated with embodiments of the communication system.

Turning to FIG. 9, FIG. 9 is a simplified flow diagram illustrating example activities that may be associated with host 14 according to an example embodiment of communication system 10. Operations 200 may begin at 202, at which host 14 may receive a request from user 12 to mount shared folder 18 at /host/shared folder. At 204, host 14 may authenticate user (e.g., with username and password, or other such authenticating mechanisms). At 206, host 14 may generate a random path. At 208, host 14 may direct storage 16 to create a substantially identical copy of shared folder 18 at random mount point 22. At 210, host 14 may direct storage 16 to apply applicable ACL policies for user 12. At 212, host 14 may redirect user 12 to random mount point 22 (rather than shared folder 18).

Figure 10:
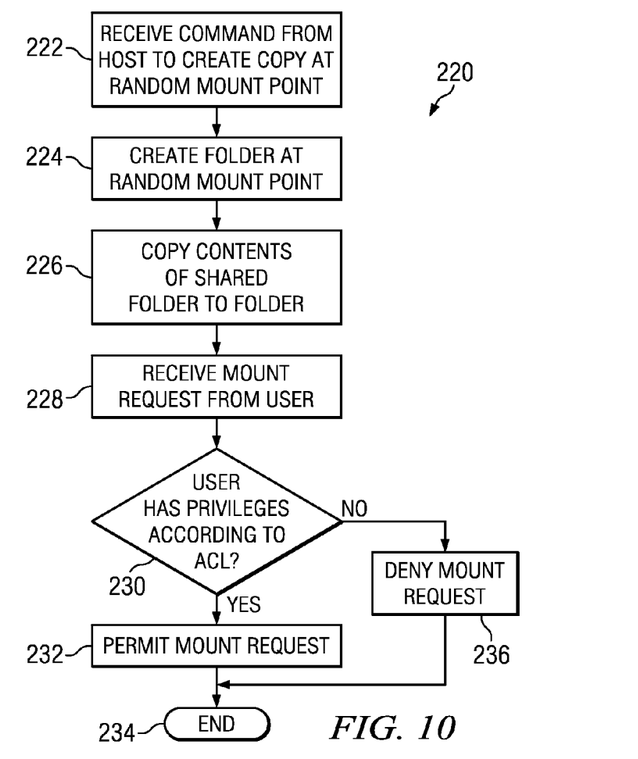
FIG. 10 is a simplified flow diagram illustrating yet other example activities that may be associated with embodiments of the communication system.

Turning to FIG. 10, FIG. 10 is a simplified flow diagram illustrating example operational activities that may be associated with storage 16 in embodiments of communication system 10. Operations 220 may begin at 222, at which storage 16 may receive a command from host 14 to create a substantially identical copy of shared folder 18 at random mount point 22. At 224, storage 16 may create a folder at random mount point 22. In some embodiments (e.g., where shared folder 18 is not located at storage 16), storage 16 may create a folder with write only permissions until the remote shared folder can be accessed and copied. At 226, storage 16 may copy substantially all contents of shared folder 18 to the newly created folder. At 228, storage 16 may receive the mount request from user 12, requesting mounting of the folder at random mount point 22. At 230, a determination may be made whether user 12 has privileges to access shared folder 18 according to applicable ACLs. At 232, if user 12 has access privileges, storage 16 may permit the mount request. At 234, the operations may end. If user 12 does not have access privileges, storage 16 may deny the mount request at 236.

Figure 11:
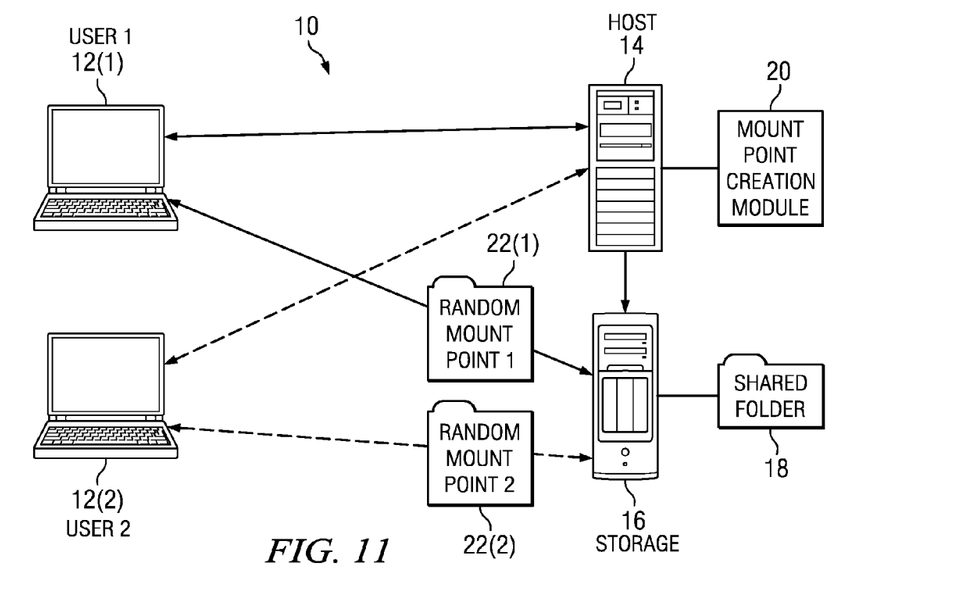
FIG. 11 is a simplified block diagram illustrating another example embodiment of the communication system.

Turning to FIG. 11, FIG. 11 is a simplified block diagram illustrating another example embodiment of communication system 10. Two clients 12(1) and 12(2) may request host 14 to mount shared folder 18. Mount point creation module 20 on host 14 may generate two random mount points 22(1) (e.g., random mount point 1) and 22(2) (e.g., random mount point 2). For example, host 14 may generate two random numbers, random#1 and random#2, corresponding to random mount points 22(1) and 22(2), respectively. Mount point creation module 20 may direct storage 16 to substantially copy shared folder 18 to random mount points 22(1) and 22(2). Host 14 may redirect user 12(1) and user 12(2) to random mount point 22(1) and random mount point 22(2), respectively. User 12(1) may mount random mount point 22(1) and user 12(2) may mount random mount point 22(2), and read and write thereto according to applicable ACL policies for the respective users. Changes made to random mount points 22(1) and 22(2) may be propagated to shared folder 18 after termination of respective user sessions of user 12(1) and user 12(2).

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an "application" as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the sharing and/or authentication activities outlined herein may be implemented in software, for example, provided by mount point creation module 20. In certain embodiments, one or more of the sharing and/or authentication features may be implemented in hardware, provided external to these previously identified elements (e.g., host 14, storage 16, mount point correlation module 20, shared folder 18, etc.), or consolidated in any appropriate manner to achieve the intended functionality. Any of the various network elements of FIG. 1 may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, mount point creation module 20 described and shown herein (and/or its associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 44) can store data used for the operations described herein. This includes the memory element being able to store instructions (e.g., software, logic, code, etc.) in non-transitory media such that the instructions are executed to carry out the activities described in this Specification. A processor can execute any type of instructions associated with the data to achieve the operations detailed herein in this Specification. In one example, processors (e.g., processor 42) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, any of the components in communication system 10 can include one or more memory elements (e.g., memory element 44) for storing information to be used in achieving operations as outlined herein. These devices may further keep information in any suitable type of non-transitory storage medium (e.g., RAM, ROM, field programmable gate array (FPGA), EPROM, EEPROM, etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method executed by a processor in a network environment, comprising:
    receiving a request over the network from a user to mount a remote shared folder at a first path, the remote shared folder and the user being separated by a public network;
    evaluating whether the user is authenticated;
    generating a random mount point locally at a different second path, the random mount point being local in the network relative to the user;
    initiating a remote session with a remote host connected to the remote shared folder, the remote shared folder being local relative to the remote host;
    copying contents of the remote shared folder to the random mount point;
    terminating the remote session with the remote host;
    redirecting the user to the second path for the local random mount point if the user is authenticated;
    propagating to the remote shared folder changes made to the contents at the local random mount point; and
    deleting the random mount point after user signoff.

2. The method of claim 1, wherein the random mount point is generated using a random number generator.

3. The method of claim 1, wherein a path for the remote shared folder is dynamically created in response to the request, and wherein the path is destroyed in response to user signoff.

4. The method of claim 1, wherein certain data of the remote shared folder is provided at a secondary location based on a caching policy.

5. The method of claim 1, further comprising:
    creating a write only copy of the remote shared folder at the random mount point.

6. The method of claim 1, further comprising:
    synchronizing the random mount point with the remote shared folder when the remote shared folder is unmounted.

7. The method of claim 1, wherein the request is received during a user session, the method further comprising:
    invalidating the random mount point when at least one of the following events occurs:
        (a) expiring of the user session; and
        (b) receiving a request from the user to unmount the remote shared folder.

8. The method of claim 1, further comprising:
    receiving a second request from a second user to mount the remote shared folder;
    generating a second random mount point locally for mounting the remote shared folder, wherein the second random mount point that is different from the random mount point previously generated; and
    redirecting the second user to the second random mount point.

9. Non-transitory media encoding logic that includes instructions for execution and when executed by a processor, is operable to perform operations comprising:
    receiving a request over the network from a user to mount a remote shared folder at a first path, the remote shared folder and the user being separated by a public network;
    evaluating whether the user is authenticated;
    generating a random mount point locally at a different second path, the random mount point being local in the network relative to the user;
    initiating a remote session with a remote host connected to the remote shared folder, the remote shared folder being local relative to the remote host;
    copying contents of the remote shared folder to the random mount point;
    terminating the remote session with the remote host;
    redirecting the user to the second path for the local random mount point if the user is authenticated;
    propagating to the remote shared folder changes made to the contents at the local random mount point; and
    deleting the random mount point after user signoff.

10. The media of claim 9, wherein the random mount point is generated using a random number generator.

11. The media of claim 9, wherein a path for the remote shared folder is dynamically created in response to the request, and wherein the path is destroyed in response to user signoff.

12. The media of claim 9, wherein certain data of the remote shared folder is provided at a secondary location based on a caching policy.

13. The media of claim 9, the operations further comprising:
    receiving a second request from a second user to mount the remote shared folder;
    generating a second random mount point locally for mounting the remote shared folder, wherein the second random mount point is different from the random mount point previously generated; and
    redirecting the second user to the second random mount point.

14. The media of claim 9, wherein the request is received during a user session, the operations further comprising:
    invalidating the random mount point when at least one of the following events occurs:
        (a) expiring of the user session; and
        (b) receiving a request from the user to unmount the remote shared folder.

15. An apparatus, comprising:
    a memory element for storing data; and
    a processor that executes instructions associated with the data, wherein the processor and the memory element cooperate such that the apparatus is configured to:
        receive a request over the network from a user to mount a remote shared folder at a first path, the shared folder and the user being separated by a public network;
        evaluate whether the user is authenticated;
        generate a random mount point locally at a different second path, the random mount point being local in the network relative to the user;
        initiate a remote session with a remote host connected to the remote shared folder, the remote shared folder being local relative to the remote host;
        copy contents of the remote shared folder to the random mount point;
        terminate the remote session with the remote host;
        redirect the user to the second path for the local random mount point if the user is authenticated;

propagate to the remote shared folder changes made to the contents at the local random mount point; and delete the random mount point after user signoff.

16. The apparatus of claim 15, wherein the random mount point is generated using a random number generator.

17. The apparatus of claim 15, wherein a path for the remote shared folder is dynamically created in response to the request, and wherein the path is destroyed in response to user signoff.

18. The apparatus of claim 15, wherein certain data of the remote shared folder is provided at a secondary location based on a caching policy.

19. The apparatus of claim 15, wherein the request is received during a user session, the apparatus being further configured to:

invalidate the random mount point when at least one of the following events occurs:
(a) expiring of the user session; and
(b) receiving a request from the user to unmount the remote shared folder.

* * * * *